(12) United States Patent
Foster et al.

(10) Patent No.: US 10,714,816 B2
(45) Date of Patent: Jul. 14, 2020

(54) ANTENNA MOUNTING ARRANGEMENT FOR A WORK VEHICLE

(71) Applicants: CNH Industrial America LLC, New Holland, PA (US); Autonomous Solutions, Inc., Mendon, UT (US)

(72) Inventors: Christopher Alan Foster, Mohnton, PA (US); Frank Zsigmond Asztalos, Orchard Lake, MI (US); Eric Michael Jacobsthal, Elmhurst, IL (US); John Henry Posselius, Ephrata, PA (US); Bret Todd Turpin, Wellsville, UT (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 36 days.

(21) Appl. No.: 15/833,367

(22) Filed: Dec. 6, 2017

(65) Prior Publication Data
US 2018/0108980 A1 Apr. 19, 2018

Related U.S. Application Data

(63) Continuation-in-part of application No. 15/178,730, filed on Jun. 10, 2016, now Pat. No. 10,153,543.

(51) Int. Cl.
*H01Q 1/32* (2006.01)
*H01Q 1/40* (2006.01)
(Continued)

(52) U.S. Cl.
CPC .......... *H01Q 1/3233* (2013.01); *G01S 19/13* (2013.01); *G01S 19/14* (2013.01); *G01S 19/49* (2013.01); *H01Q 1/3275* (2013.01); *H01Q 1/40* (2013.01); *B62D 25/06* (2013.01); *B62D 49/00* (2013.01); *G05D 1/0278* (2013.01)

(58) Field of Classification Search
CPC ...... B62D 49/00; B62D 25/06; H01Q 1/3233; H01Q 1/3275; H01Q 1/40; H01Q 9/0407; H01Q 9/28; H01Q 21/29; H01Q 21/293; H01Q 25/005

See application file for complete search history.

(56) References Cited

U.S. PATENT DOCUMENTS

| 5,402,134 A | * | 3/1995 | Miller | H01Q 1/3275 343/713 |
| 5,532,709 A | * | 7/1996 | Talty | H01Q 1/3233 343/713 |

(Continued)

FOREIGN PATENT DOCUMENTS

JP 2009055795 3/2009

*Primary Examiner* — Tho G Phan
(74) *Attorney, Agent, or Firm* — Rickard K. DeMille; Rebecca L. Henkel

(57) ABSTRACT

A work vehicle includes a roof panel forming a portion of a cab of the work vehicle. The work vehicle also includes a headliner disposed between the roof panel and an interior of the cab. In addition, the work vehicle includes a spatial locating antenna positioned between the roof panel and the headliner, such that a top side of the roof panel is positioned above the spatial locating antenna relative to a ground surface. Furthermore, the top side of the roof panel extends beyond a lateral extent and a longitudinal extent of the spatial locating antenna.

18 Claims, 7 Drawing Sheets

(51) Int. Cl.
  *G01S 19/13* (2010.01)
  *G01S 19/14* (2010.01)
  *G01S 19/49* (2010.01)
  *B62D 49/00* (2006.01)
  *G05D 1/02* (2020.01)
  *B62D 25/06* (2006.01)

(56) References Cited

U.S. PATENT DOCUMENTS

| | | | | |
|---|---|---|---|---|
| 5,625,371 | A * | 4/1997 | Miller | H01Q 7/00 343/742 |
| 7,158,884 | B2 | 1/2007 | Takahashi | |
| 7,183,519 | B2 | 2/2007 | Horiyama et al. | |
| 7,880,595 | B2 | 2/2011 | Shimura | |
| 9,024,829 | B1 * | 5/2015 | Platt | H01Q 21/28 343/711 |
| 2002/0120399 | A1 | 8/2002 | Morita | |
| 2002/0193946 | A1 * | 12/2002 | Turnbull | G01C 21/3626 701/493 |
| 2006/0044196 | A1 * | 3/2006 | Grant | H01Q 1/3275 343/713 |

* cited by examiner

US 10,714,816 B2

ANTENNA MOUNTING ARRANGEMENT FOR A WORK VEHICLE

CROSS-REFERENCE TO RELATED APPLICATION

This application is a continuation-in-part of U.S. patent application Ser. No. 15/178,730, entitled "ANTENNA MOUNTING ARRANGEMENT FOR AN OFF-ROAD VEHICLE," filed Jun. 10, 2016, which is herein incorporated by reference in its entirety.

BACKGROUND

The present disclosure relates generally to an antenna mounting arrangement for a work vehicle.

Certain work vehicles, such as tractors or other prime movers, may be controlled by a control system (e.g., without operator input, with limited operator input, etc.) during certain phases of operation. For example, a controller may instruct a steering control system and/or a speed control system of the work vehicle to automatically or semi-automatically guide the work vehicle along a guidance swath through a field. To facilitate control of the work vehicle, the controller may receive position information from a spatial locating device, such as a Global Position System (GPS) receiver. The GPS receiver is typically communicatively coupled to a GPS antenna mounted to an exterior surface of the work vehicle. Unfortunately, mounting the GPS antenna to the exterior surface of the vehicle detracts from the appearance of the work vehicle and exposes the GPS antenna to dirt/debris within the field.

BRIEF DESCRIPTION

In one embodiment, a work vehicle includes a roof panel forming a portion of a cab of the work vehicle. The work vehicle also includes a headliner disposed between the roof panel and an interior of the cab. In addition, the work vehicle includes a first spatial locating antenna positioned between the roof panel and the headliner, such that a top side of the roof panel is positioned above the first spatial locating antenna relative to a ground surface. Furthermore, the top side of the roof panel extends beyond a lateral extent and a longitudinal extent of the first spatial locating antenna.

In another embodiment, a work vehicle includes a body and a spatial locating antenna positioned beneath the body. A top side of the body is positioned above the spatial locating antenna relative to a ground surface, and the top side extends beyond a lateral extent and a longitudinal extent of the spatial locating antenna. The work vehicle also includes a first coating disposed on an outer surface of the top side of the body. The outer surface of the top side faces away from the spatial locating antenna, and the first coating includes a gap aligned with the spatial locating antenna to facilitate passage of a spatial locating signal through the body to the spatial locating antenna. In addition, the work vehicle includes a second coating disposed on the outer surface of the top side of the body within the gap. The second coating comprises a paint layer, and the second coating is configured to facilitate passage of the spatial locating signal to the spatial locating antenna.

In a further embodiment, a work vehicle includes a roof panel forming a portion of a cab of the work vehicle. The work vehicle also includes a first spatial locating antenna positioned beneath the roof panel, such that a top side of the roof panel is positioned above the first spatial locating antenna relative to a ground surface. In addition, the top side of the roof panel extends beyond a lateral extent and a longitudinal extent of the first spatial locating antenna. Furthermore, the work vehicle includes a coating disposed on an outer surface of the top side of the roof panel. The outer surface of the top side of the roof panel faces away from the first spatial locating antenna, and the coating is configured to facilitate passage of a spatial locating signal through the roof panel to the first spatial locating antenna.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
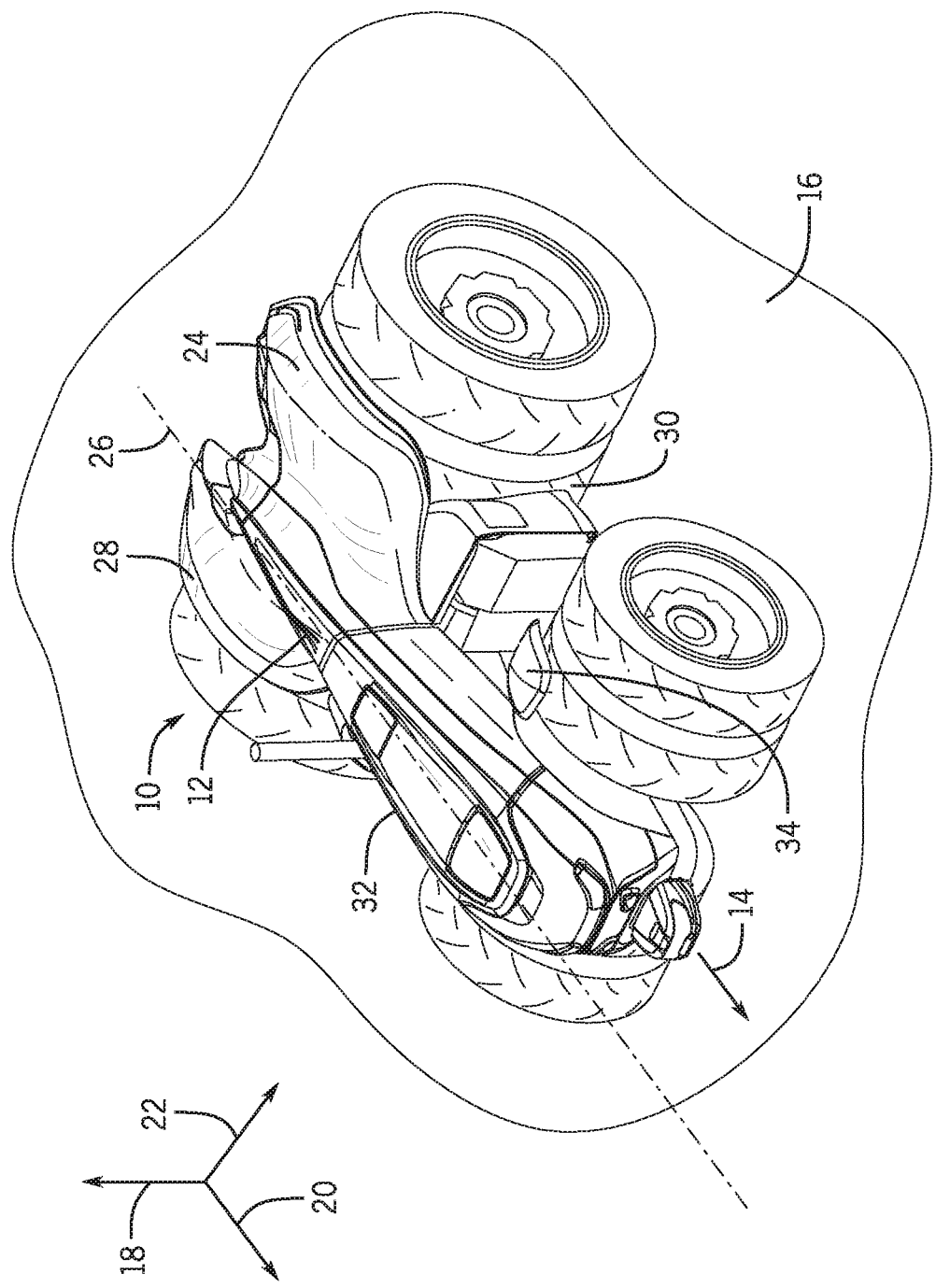
FIG. 1 is a perspective view of an embodiment of an autonomous work vehicle that may include one or more antennas positioned under a body of the work vehicle.

Turning now to the drawings, FIG. 1 is a perspective view of an embodiment of an autonomous work vehicle 10 that may include one or more antennas positioned under a body 12 of the autonomous work vehicle 10. The autonomous work vehicle 10 includes a control system configured to automatically guide the work vehicle 10 through a field (e.g., along a direction of travel 14) to facilitate agricultural operations (e.g., planting operations, seeding operations, application operations, tillage operations, harvesting operations, etc.). For example, the control system may automatically guide the autonomous work vehicle 10 along a guidance swath through the field without input from an operator. The control system may also automatically guide the autonomous work vehicle 10 around headland turns between segments of the guidance swath.

To facilitate control of the autonomous work vehicle, the control system includes a spatial locating device, such as a Global Position System (GPS) receiver, which is configured to output position information to a controller of the control system. As discussed in detail below, the spatial locating device is communicatively coupled to at least one spatial locating antenna, which is configured to receive spatial locating signals. The spatial locating device is configured to determine the position and/or orientation of the autonomous work vehicle based at least in part on the spatial locating signals.

In the illustrated embodiment, the spatial locating antenna(s) are positioned beneath the body 12 of the autonomous work vehicle 10. Accordingly, each spatial locating antenna is positioned below a top side of the body relative to a ground surface 16 along a vertical axis 18. In certain embodiments, the top side of the body extends beyond a longitudinal extent of each spatial locating antenna (e.g., an extent of the spatial locating antenna along a longitudinal axis 20) and a lateral extent of the spatial locating antenna (e.g., an extent of the spatial locating antenna along a lateral axis 22). As a result, the top surface of the body 12 completely covers each spatial locating antenna. The body is formed from a material (e.g., fiberglass, a polymeric material, etc.) that facilitates passage of the spatial locating signals (e.g., GPS signals of about 1 GHz to about 2 GHz) through the body 12 to each spatial locating antenna. Positioning the spatial locating antenna(s) beneath the body 12 may enhance the appearance of the autonomous work vehicle and/or protect the spatial locating antenna(s) from dirt/debris within the field.

In certain embodiments, a coating is disposed on an outer surface of the top side of the body 12. Certain coatings, such as metallic paints and/or paints containing a high carbon content may interfere with (e.g., at least partially block) the spatial locating signals. Accordingly, to facilitate passage of the spatial locating signals through the body 12 to each spatial locating antenna when such a coating is utilized, gap(s) aligned with the respective spatial locating antenna(s) are formed in the coating. In certain embodiments, a second coating is disposed on the outer surface of the top side of the body within the gap(s) to enhance the appearance of the autonomous work vehicle 10. The second coating is configured to facilitate passage of the spatial locating signals to the spatial locating antenna(s). For example, the second coating may include a non-metallic paint and/or a paint having a low carbon content (e.g., less than 10 percent, less than 5 percent, less than 1 percent, etc.). Alternatively or additionally, the second coating may include a decal (e.g., a vinyl decal) disposed on the outer surface of the top side of the body within the gap.

In certain embodiments, at least one spatial locating antenna is positioned beneath at least one fender of the body 12. In the illustrated embodiment, the body 12 includes a first rear fender 24 on a first lateral side of a longitudinal centerline 26 of the autonomous work vehicle 10. The body 12 also includes a second rear fender 28 on a second lateral side of the longitudinal centerline 26, opposite the first lateral side. As illustrated, each rear fender is positioned over a respective wheel, which is configured to engage the ground surface 16. While each rear fender is positioned over a single wheel, it should be appreciated that in alternative embodiments, one or more of the rear fenders may be positioned over two or more wheels. In addition, if the autonomous work vehicle includes tracks, each rear fender may be positioned over one or more tracks. In certain embodiments, the control system includes a first spatial locating antenna positioned beneath the first rear fender 24 and a second spatial locating antenna positioned beneath the second rear fender 28. Positioning the spatial locating antennas beneath the rear fenders enables each spatial locating antenna to be positioned a greater distance from the longitudinal centerline 26 than spatial locating antennas positioned on a roof of an operator cab (e.g., because the lateral extent of the rear fenders is greater than the lateral extent of the operator cab). As a result, the accuracy of a vehicle orientation determined by the spatial locating receiver and/or the controller may be enhanced. In certain embodiments, at least one spatial locating antenna may be positioned beneath the hood 32 and/or the front fender(s) 34 of the autonomous work vehicle 10 (e.g., in addition to the rear fenders or instead of the rear fenders).

Figure 2:
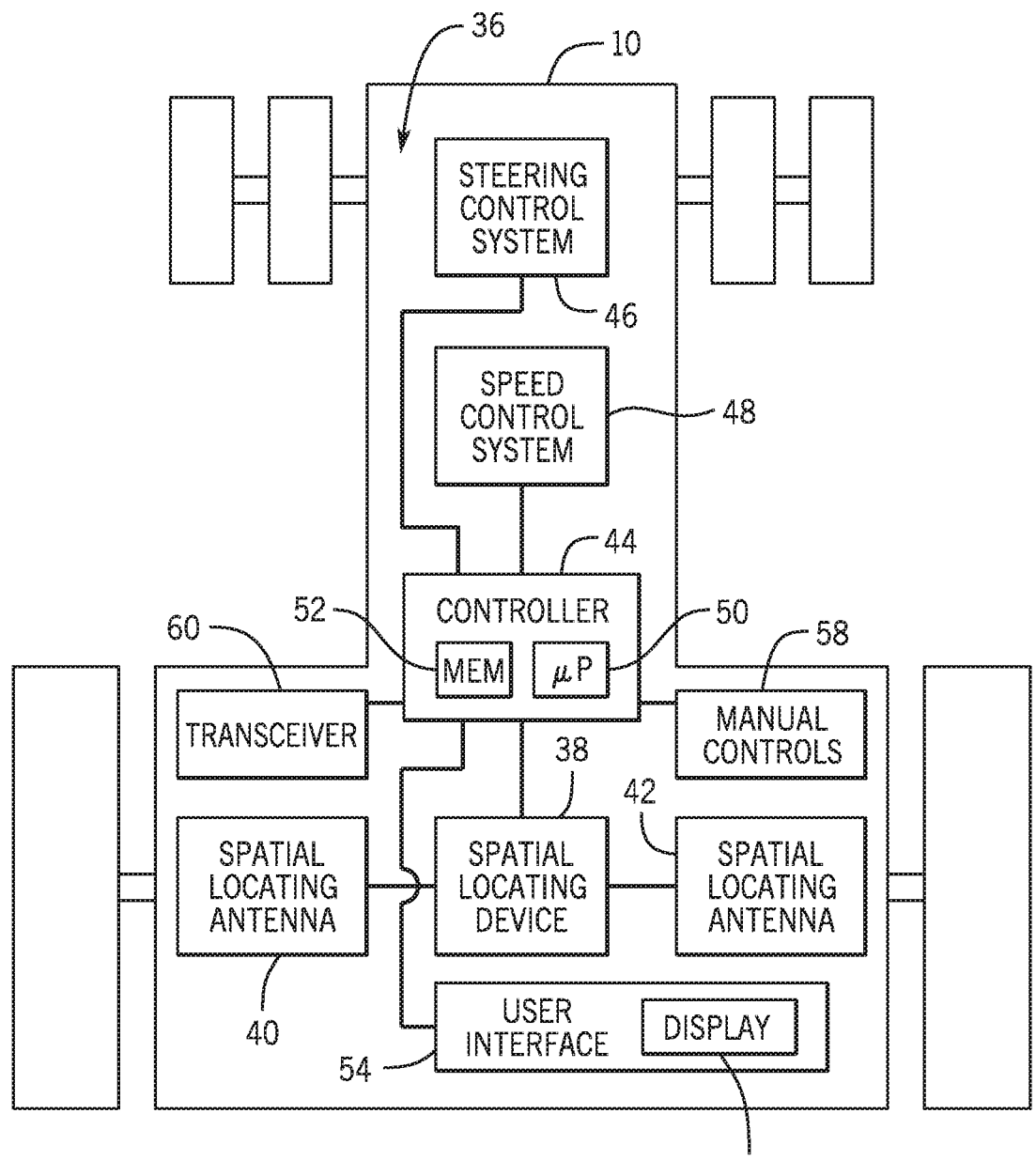
FIG. 2 is a schematic diagram of an embodiment of a control system that may be employed within the autonomous work vehicle of FIG. 1.

FIG. 2 is a schematic diagram of an embodiment of a control system 36 that may be employed within the work vehicle 10 of FIG. 1. In the illustrated embodiment, the control system 36 includes a spatial locating device 38, which is mounted to the autonomous work vehicle 10 and configured to determine a position, and in certain embodiments a velocity, of the autonomous work vehicle 10. As will be appreciated, the spatial locating device 38 may include any suitable system configured to measure and/or determine the position of the autonomous work vehicle 10, such as a GPS receiver, for example.

In the illustrated embodiment, the control system 36 also includes a first spatial locating antenna 40 and a second spatial locating antenna 42, each communicatively coupled to the spatial locating device 38. Each spatial locating antenna is configured to receive spatial locating signals (e.g., GPS signals from GPS satellites) and to output corresponding spatial locating data to the spatial locating device 38. As discussed in detail below, the spatial locating antennas 40 and 42 are positioned on opposite lateral sides of the longitudinal centerline 26. The spatial locating device 38 is configured to determine the position of each spatial locating antenna (e.g., based at least in part on the spatial locating signals). The spatial locating device 38 and/or a controller 44 of the control system 36 is configured to determine the orientation of the autonomous work vehicle 10 based at least in part on the position of each spatial locating antenna. Increasing the lateral separation distance between the spatial locating antennas may increase the accuracy of the vehicle orientation determination. Accordingly, in certain embodiments, the spatial locating antennas are positioned beneath rear fenders of the autonomous work vehicle to increase the lateral separation distance between the spatial locating antennas (e.g., as compared to spatial locating antennas mounted on a roof of an operator cab). While the illustrated control system 36 includes two spatial locating antennas, it should be appreciated that in alternative embodiments, the control system may include more or fewer spatial locating antennas (e.g., 1, 2, 3, 4, 5, 6, or more).

In certain embodiments, the control system may also include an inertial measurement unit (IMU) communicatively coupled to the controller and configured to enhance the accuracy of the determined position and/or orientation. For example, the IMU may include one or more accelerometers configured to output signal(s) indicative of acceleration along the longitudinal axis, the lateral axis, the vertical axis, or a combination thereof. In addition, the IMU may include one or more gyroscopes configured to output signal(s) indicative of rotation (e.g., rotational angle, rotational velocity, rotational acceleration, etc.) about the longitudinal axis, the lateral axis, the vertical axis, or a combination thereof. The controller may determine the position and/or orientation of the work vehicle based on the IMU signal(s) while the spatial locating signals received by the spatial locating antennas are insufficient to facilitate position determination (e.g., while an obstruction, such as a tree or building, blocks the spatial locating signals from reaching the spatial locating antennas). In addition, the controller may utilize the IMU signal(s) to enhance the accuracy of the determined position and/or orientation. For example, the controller may combine the IMU signal(s) with the spatial locating data and/or the position determined by the spatial locating device (e.g., via Kalman filtering, least squares fitting, etc.) to determine a more accurate position and/or orientation of the work vehicle (e.g., by compensating for movement of the spatial locating antennas resulting from pitch and/or roll of the work vehicle as the work vehicle traverses uneven terrain).

In certain embodiments, the IMU and the spatial locating device may be disposed within a common housing. In further embodiments, the IMU and one spatial locating antenna may be disposed within a common housing. For example, each spatial locating antenna housing may include a spatial locating antenna and an IMU. Furthermore, in certain embodiments, a portion of the spatial locating device and one spatial locating antenna may be disposed within a common housing. For example, a first portion of the spatial locating device and the first spatial locating antenna may be disposed within a first housing, and a second portion of the spatial locating device and the second spatial locating antenna may be disposed within a second housing. In certain embodiments, a first IMU may be disposed within the first housing, and a second IMU may be disposed within the second housing.

In the illustrated embodiment, the control system 36 includes a steering control system 46 configured to control a direction of movement of the autonomous work vehicle 10, and a speed control system 48 configured to control a speed of the autonomous work vehicle 10. In addition, the control system 36 includes the controller 44, which is communicatively coupled to the spatial locating device 38, to the steering control system 46, and to the speed control system 48. The controller 44 is configured to automatically control the autonomous work vehicle during certain phases of agricultural operations (e.g., without operator input, with limited operator input, etc.).

In certain embodiments, the controller 44 is an electronic controller having electrical circuitry configured to process data from the spatial locating device 38 and/or other components of the control system 36. In the illustrated embodiment, the controller 44 include a processor, such as the illustrated microprocessor 50, and a memory device 52. The controller 44 may also include one or more storage devices and/or other suitable components. The processor 50 may be used to execute software, such as software for controlling the autonomous work vehicle, software for determining vehicle orientation, and so forth. Moreover, the processor 50 may include multiple microprocessors, one or more "general-purpose" microprocessors, one or more special-purpose microprocessors, and/or one or more application specific integrated circuits (ASICS), or some combination thereof. For example, the processor 50 may include one or more reduced instruction set (RISC) processors.

The memory device 52 may include a volatile memory, such as random access memory (RAM), and/or a nonvolatile memory, such as read-only memory (ROM). The memory device 52 may store a variety of information and may be used for various purposes. For example, the memory device 52 may store processor-executable instructions (e.g., firmware or software) for the processor 50 to execute, such as instructions for controlling the autonomous work vehicle, instructions for determining vehicle orientation, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., position data, vehicle geometry data, etc.), instructions (e.g., software or firmware for controlling the autonomous work vehicle, etc.), and any other suitable data.

In certain embodiments, the steering control system 46 may include a wheel angle control system, a differential braking system, a torque vectoring system, or a combination thereof. The wheel angle control system may automatically rotate one or more wheels and/or tracks of the autonomous work vehicle (e.g., via hydraulic actuators) to steer the autonomous work vehicle along a desired route (e.g., along the guidance swath, along headline turns, etc.). By way of example, the wheel angle control system may rotate front wheels/tracks, rear wheels/tracks, intermediate wheels/tracks, or a combination thereof, of the autonomous work vehicle (e.g., either individually or in groups). The differential braking system may independently vary the braking force on each lateral side of the autonomous work vehicle to direct the autonomous work vehicle along a path. Similarly, the torque vectoring system may differentially apply torque from an engine to wheel(s) and/or track(s) on each lateral side of the autonomous work vehicle, thereby directing the autonomous work vehicle along a path. In further embodiments, the steering control system may include other and/or additional systems to facilitate directing the autonomous work vehicle along a path through the field.

In certain embodiments, the speed control system 48 may include an engine output control system, a transmission control system, a braking control system, or a combination thereof. The engine output control system may vary the output of the engine to control the speed of the autonomous work vehicle. For example, the engine output control system may vary a throttle setting of the engine, a fuel/air mixture of the engine, a timing of the engine, other suitable engine parameters to control engine output, or a combination thereof. In addition, the transmission control system may adjust a gear ratio of a transmission (e.g., by adjusting gear selection in a transmission with discrete gears, by controlling a continuously variable transmission (CVT), etc.) to control the speed of the autonomous work vehicle. Furthermore, the braking control system may adjust braking force, thereby controlling the speed of the autonomous work vehicle. In further embodiments, the speed control system may include other and/or additional systems to facilitate adjusting the speed of the autonomous work vehicle.

In certain embodiments, the control system may also control operation of an agricultural implement coupled to the autonomous work vehicle. For example, the control system may include an implement control system/implement controller configured to control a steering angle of the implement (e.g., via an implement steering control system having a wheel angle control system and/or a differential braking system) and/or a speed of the autonomous work vehicle/implement system (e.g., via an implement speed control system having a braking control system). In such embodiments, the control system may be communicatively coupled to a control system/controller on the implement via a communication network, such as a controller area network (CAN bus).

In the illustrated embodiment, the control system 36 includes a user interface 54 communicatively coupled to the controller 44. The user interface 54 is configured to enable an operator (e.g., standing proximate to the autonomous work vehicle) to control certain parameter(s) associated with operation of the autonomous work vehicle. For example, the user interface 54 may include a switch that enables the operator to selectively configure the autonomous work vehicle for autonomous or manual operation. In addition, the user interface 54 may include a battery cut-off switch, an engine ignition switch, a stop button, or a combination thereof, among other controls. In certain embodiments, the user interface 54 includes a display 56 configured to present information to the operator, such as a graphical representation of a guidance swath, a visual representation of certain parameter(s) associated with operation of the autonomous work vehicle (e.g., fuel level, oil pressure, water temperature, etc.), a visual representation of certain parameter(s) associated with operation of an implement coupled to the autonomous work vehicle (e.g., seed level, penetration depth of ground engaging tools, orientation(s)/position(s) of certain components of the implement, etc.), or a combination thereof, among other information. In certain embodiments, the display 56 may include a touch screen interface that enables the operator to control certain parameters associated with operation of the autonomous work vehicle and/or the implement.

In the illustrated embodiment, the control system 36 includes manual controls 58 configured to enable an operator to control the autonomous work vehicle while automatic control is disengaged (e.g., while unloading the autonomous work vehicle from a trailer, etc.). The manual controls 58 may include manual steering control, manual transmission control, manual braking control, or a combination thereof, among other controls. In the illustrated embodiment, the manual controls 58 are communicatively coupled to the controller 44. The controller 44 is configured to disengage automatic control of the autonomous work vehicle upon receiving a signal indicative of manual control of the autonomous work vehicle. Accordingly, if an operator controls the autonomous work vehicle manually, the automatic control terminates, thereby enabling the operator to control the autonomous work vehicle.

In the illustrated embodiment, the control system 36 includes a transceiver 60 communicatively coupled to the controller 44. In certain embodiments, the transceiver 60 is configured to establish a communication link with a corresponding transceiver of a base station, thereby facilitating communication between the base station and the control system of the autonomous work vehicle. For example, the base station may include a user interface that enables a remote operator to provide instructions to the control system (e.g., instructions to initiate automatic control of the autonomous work vehicle, instructions to direct the autonomous work vehicle along a path, etc.). The user interface may also enable a remote operator to provide data to the control system. The transceiver 60 may operate at any suitable frequency range within the electromagnetic spectrum. For example, in certain embodiments, the transceiver 60 may broadcast and receive radio waves within a frequency range of about 1 GHz to about 10 GHz. In addition, the transceiver 60 may utilize any suitable communication protocol, such as a standard protocol (e.g., Wi-Fi, Bluetooth, etc.) or a proprietary protocol.

In certain embodiments, the control system may include other and/or additional controllers/control systems, such as the implement controller/control system discussed above. For example, the implement controller/control system may be configured to control various parameters of an agricultural implement towed by the work vehicle. In certain embodiments, the implement controller/control system may be configured to instruct actuator(s) to adjust a penetration depth of at least one ground engaging tool of the agricultural implement. By way of example, the implement controller/control system may instruct actuator(s) to reduce or increase the penetration depth of each tillage point on a tilling implement, or the implement controller/control system may instruct actuator(s) to engage or disengage each opener disc/blade of a seeding/planting implement from the soil. Furthermore, the implement controller/control system may instruct actuator(s) to transition the agricultural implement between a working position and a transport portion, to adjust a flow rate of product from the agricultural implement, or to adjust a position of a header of the agricultural implement (e.g., a harvester, etc.), among other operations. The work vehicle control system may also include controller(s)/control system(s) for electrohydraulic remote(s), power take-off shaft(s), adjustable hitch(es), or a combination thereof, among other controllers/control systems.

Figure 3:
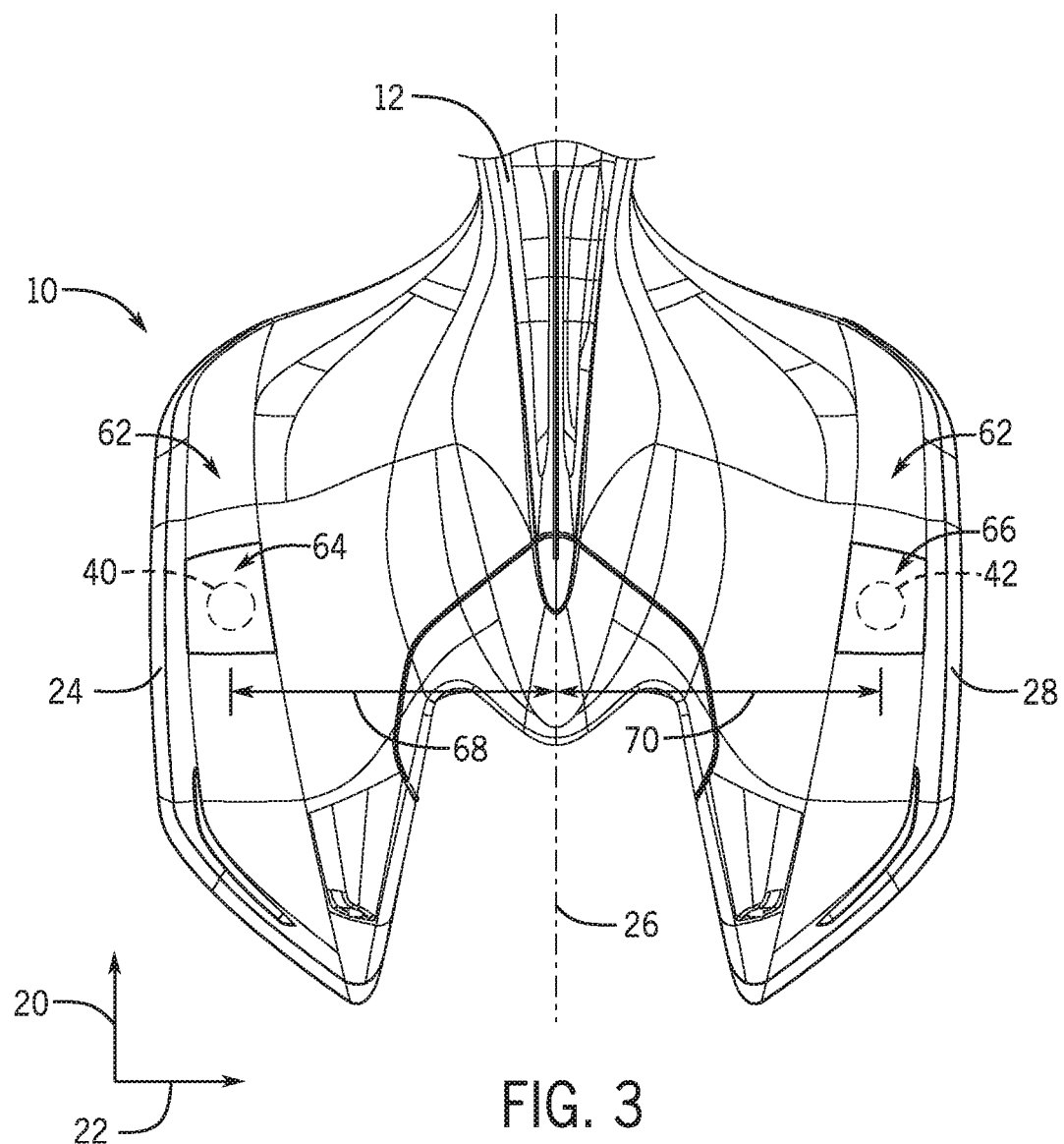
FIG. 3 is a top view of a portion of the autonomous work vehicle of FIG. 1.

FIG. 3 is a top view of a portion of the autonomous work vehicle 10 of FIG. 1. In the illustrated embodiment, the control system includes two spatial locating antennas. The first spatial locating antenna 40 is positioned beneath the first rear fender 24, and the second spatial locating antenna 42 is positioned beneath the second rear fender 28. Accordingly, a top side of each fender is positioned above a respective spatial locating antenna. In the illustrated embodiment, the top side of the first rear fender 24 extends beyond the lateral extent and the longitudinal extent of the first spatial locating antenna 40 (e.g., the extent of the first spatial locating antenna 40 along the lateral axis 22 and along the longitudinal axis 20), and the top side of the second rear fender 28 extends beyond the lateral extent and the longitudinal extent of the second spatial locating antenna 42 (e.g., the extent of the second spatial locating antenna 42 along the lateral axis 22 and along the longitudinal axis 20). However, it should be appreciated that in alternative embodiments, the top surface of at least one fender may only extend along a portion of the lateral extent and/or the longitudinal extent of the respective spatial locating antenna.

In certain embodiments, a coating 62 is disposed on at least a portion of an outer surface of the top side of the body 12. In the illustrated embodiment, the coating 62 is disposed on the outer surface of the top side of the first rear fender 24 and on the outer surface of the top side of the second rear fender 28. The coating 62 may include paint (e.g., metallic paint, flat paint, pearlescent paint, etc.), a decal (e.g., vinyl decal, etc.), another suitable type of coating (e.g., gel coat, polymeric coating, etc.), or a combination thereof. Certain coatings (e.g., metallic paints, paints having a high carbon content, etc.) may interfere with (e.g., at least partially block) the spatial locating signals. Accordingly, to facilitate passage of the spatial locating signals through the top side of each fender to the respective spatial locating antenna when such a coating is utilized, a first gap 64 in the coating 62 is formed over the first rear fender 24, and a second gap 66 in the coating 62 is formed over the second rear fender 28. Each gap is aligned with a respective spatial locating antenna, thereby facilitating passage of the spatial locating signals to the respective spatial locating antenna. In the illustrated embodiment, the first gap 64 extends beyond the lateral extent and the longitudinal extent of the first spatial locating antenna 40 (e.g., the extent of the first spatial locating antenna 40 along the lateral axis 22 and along the longitudinal axis 20), and the second gap 66 extends beyond the lateral extent and the longitudinal extent of the second spatial locating antenna 42 (e.g., the extent of the second spatial locating antenna 42 along the lateral axis 22 and along the longitudinal axis 20). However, it should be appreciated that in alternative embodiments, at least one gap may extend over a portion of the lateral extent and/or a portion of the longitudinal extent of the respective spatial locating antenna.

In certain embodiments, a second coating is disposed on the outer surface of the top side of at least one fender within the respective gap to enhance the appearance of the autonomous work vehicle 10. The second coating is configured to facilitate passage of the spatial locating signals to the spatial locating antenna(s). For example, the second coating may include a non-metallic paint and/or a paint having a low carbon content (e.g., less than 10 percent, less than 5 percent, less than 1 percent, etc.). Alternatively or additionally, the second coating may include a decal (e.g., a vinyl decal) disposed on the outer surface of the top side of the fender within the gap.

As illustrated, the first spatial locating antenna 40 is positioned a first lateral distance 68 (e.g., distance along the lateral axis 22) from the longitudinal centerline 26, and the second spatial locating antenna 42 is positioned a second lateral distance 70 (e.g., distance along the lateral axis 22) from the longitudinal centerline 26. In the illustrated embodiment, the first lateral distance 68 is substantially equal to the second lateral distance 70. Each spatial locating antenna is positioned proximate to a distal end of the top side of the respective fender (e.g., proximate to the maximum lateral extent of the respective fender relative to the longitudinal centerline 26). As a result, the spatial locating antennas 40 and 42 are positioned a sufficient lateral distance away from one another to facilitate vehicle orientation determination. For example, each spatial locating antenna may be positioned a greater distance from the longitudinal centerline 26 than spatial locating antennas positioned on a roof of an operator cab. Accordingly, the accuracy of the vehicle orientation determination may be enhanced. Furthermore, because the spatial locating antennas are positioned beneath the fenders, the appearance of the autonomous work vehicle may be enhanced, and/or the spatial locating antennas may be protected from dirt/debris within the field. In addition, the fenders may shield the spatial locating antennas from solar radiation, thereby reducing the temperature of the spatial locating antennas, as compared to spatial locating antennas mounted on an exterior surface of the vehicle body.

While one spatial locating antenna is positioned beneath each fender, it should be appreciated that in alternative embodiments, more or fewer spatial locating antennas may be positioned beneath each fender (e.g., 0, 1, 2, 3, 4, or more). In addition, in certain embodiments, one or more spatial locating antennas may be positioned beneath other portions of the body, such as below a top surface of the hood, among other locations (e.g., instead of spatial locating antennas positioned beneath the fenders or in addition to the spatial locating antenna(s) positioned beneath the fenders). In such embodiments, a coating on the body may include a gap to facilitate passage of the spatial locating signals through the body to the spatial locating antenna(s). Furthermore, while the spatial locating antennas are positioned beneath respective fenders in the illustrated embodiment, in other embodiments, at least one spatial locating antenna may be positioned above a respective fender. For example, the first spatial locating antenna may be positioned above the first rear fender, and the second spatial locating antenna may be positioned above the second rear fender. By mounting the spatial locating antennas above respective fenders, each spatial locating antenna may be positioned a greater distance from the longitudinal centerline than spatial locating antennas positioned on a roof of an operator cab. Accordingly, the accuracy of the vehicle orientation determination may be enhanced.

Figure 4:
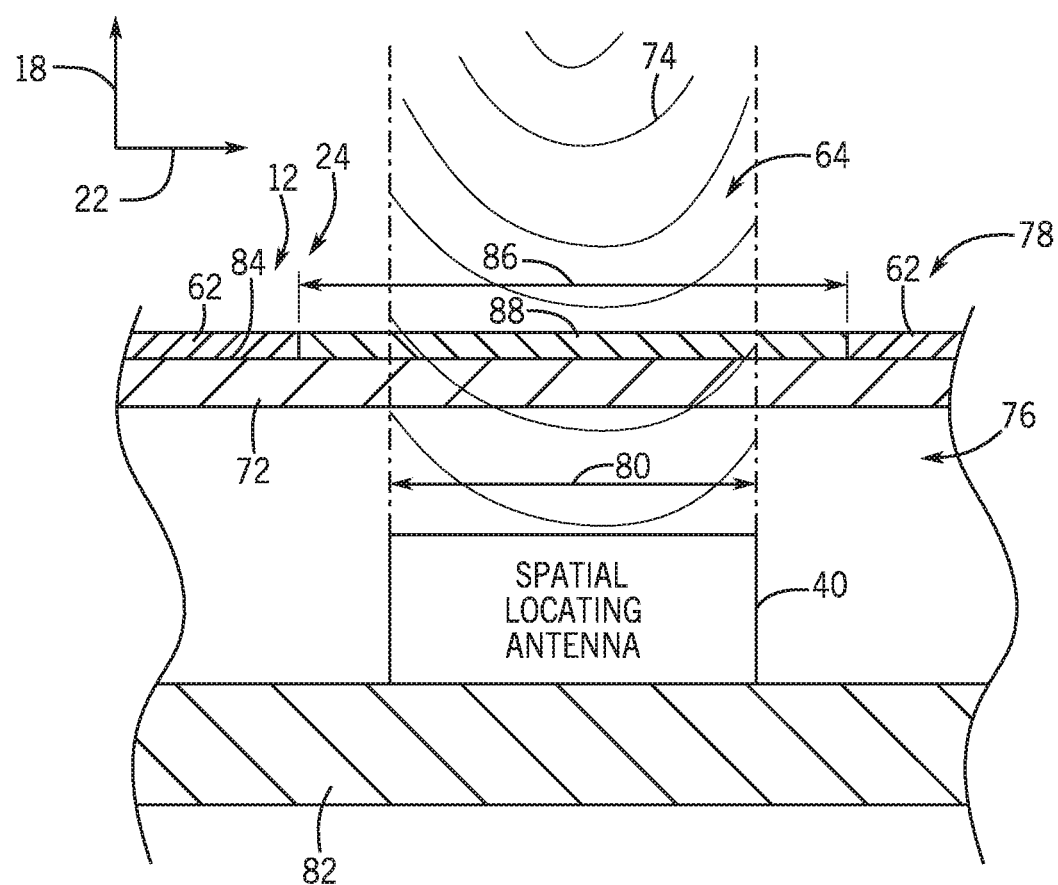
FIG. 4 is a cross-sectional view of an embodiment of a body that may be employed within the autonomous work vehicle of FIG. 1.

FIG. 4 is a cross-sectional view of an embodiment of a body 12 that may be employed within the autonomous work vehicle of FIG. 1. As illustrated, the first spatial locating antenna 40 is positioned beneath the first rear fender 24 of the body 12. Accordingly, a top side 72 (e.g., top wall) of the first rear fender 24 is positioned above the first spatial locating antenna 40 relative to the ground surface (e.g., the top side 72 is positioned above the spatial locating antenna 40 along the vertical axis 18). In certain embodiments, the body 12 is formed from a material that facilitates passage of the spatial locating signals 74 through the body 12, such as fiber glass or a polymeric material, among others. Accordingly, the spatial locating antenna 40, which is positioned on a first side 76 of the top side 72, may receive the spatial locating signals 74 through the top side 72 from a second side 78 to the first side 76. As illustrated, the top side 72 extends beyond the lateral extent 80 of the spatial locating antenna 40, and in certain embodiments, the top side 72 is formed from a continuous piece of material (e.g., fiber glass, a polymeric material, etc.). In the illustrated embodiment, the spatial locating antenna 40 is coupled to a frame 82 of the autonomous work vehicle. However, it should be appreciated that in alternative embodiments, the spatial locating antenna may be coupled to other structures of the autonomous work vehicle.

In the illustrated embodiment, a coating 62 is disposed on an outer surface 84 of the top side 72 of the body/fender. As illustrated, the outer surface 84 of the top side 72 faces away from the spatial locating antenna 40 (e.g., the outer surface 84 faces the second side 78). The coating 62 has a gap 64 aligned with the spatial locating antenna 40 to facilitate passage of the spatial locating signals through the body/fender to the spatial locating antenna 40. In the illustrated embodiment, the gap 64 extends beyond the lateral extent 80 of the spatial locating antenna 40. Accordingly, a lateral extent 86 of the gap 64 is greater than the lateral extent 80 of the spatial locating antenna 40. In certain embodiments, the gap may extend beyond the longitudinal extent of the spatial locating antenna.

In the illustrated embodiment, a second coating 88 is disposed on the outer surface 84 of the top side 72 of the body/fender within the gap 64. The second coating 88 is configured to facilitate passage of the spatial locating signals 74 to the spatial locating antenna 40. For example, the second coating 88 may include a non-metallic paint and/or a paint having a low carbon content (e.g., less than 10 percent, less than 5 percent, less than 1 percent, etc.). Alternatively or additionally, the second coating 88 may include a decal (e.g., a vinyl decal) disposed on the outer surface 84 of the top side 72 of the body/fender within the gap 64. In certain embodiments, other and/or additional coatings may be included. For example, a clear coat may be disposed on the coating 62 and/or the second coating 88. As used herein, "disposed on" includes directly disposed on and indirectly disposed on. Accordingly, a coating is considered to be disposed on a surface even if an intervening coating is present. For example, a base coat and/or a primer may be applied to the outer surface 84 of the top side 72 of the body/fender, and the coating 62 and/or the second coating 88 may be applied to the base coat/primer. In such a configuration, the coating 62 and/or the second coating 88 are considered to be disposed on the outer surface 84 of the top side 72 of the body/fender.

While FIG. 4 describes the body/fender and coating(s) with reference to the first spatial locating antenna 40, it should be appreciated that in certain embodiments, a similar configuration may be utilized for the second spatial locating antenna. Furthermore, in certain embodiments, the configuration disclosed above may be utilized for other antennas (e.g., an antenna of the transceiver, etc.) of the autonomous work vehicle. For example, an antenna of the transceiver may be positioned on a first side of a wall of the body, and the antenna may be configured to receive a signal passing through the wall from a second side to the first side and/or to transmit a signal through the wall from the first side to the second side. In addition, a coating may be disposed on an outer surface of the wall facing the second side, and the coating may have a gap aligned with the antenna to facilitate passage of the signal through the wall. While the antenna mounting arrangement is described above with reference to an autonomous work vehicle, it should be appreciated that in alternative embodiments, the antenna mounting arrangement may be utilized within other vehicles, such as manually control tractors, manually controlled harvesters, and the like.

Figure 5:
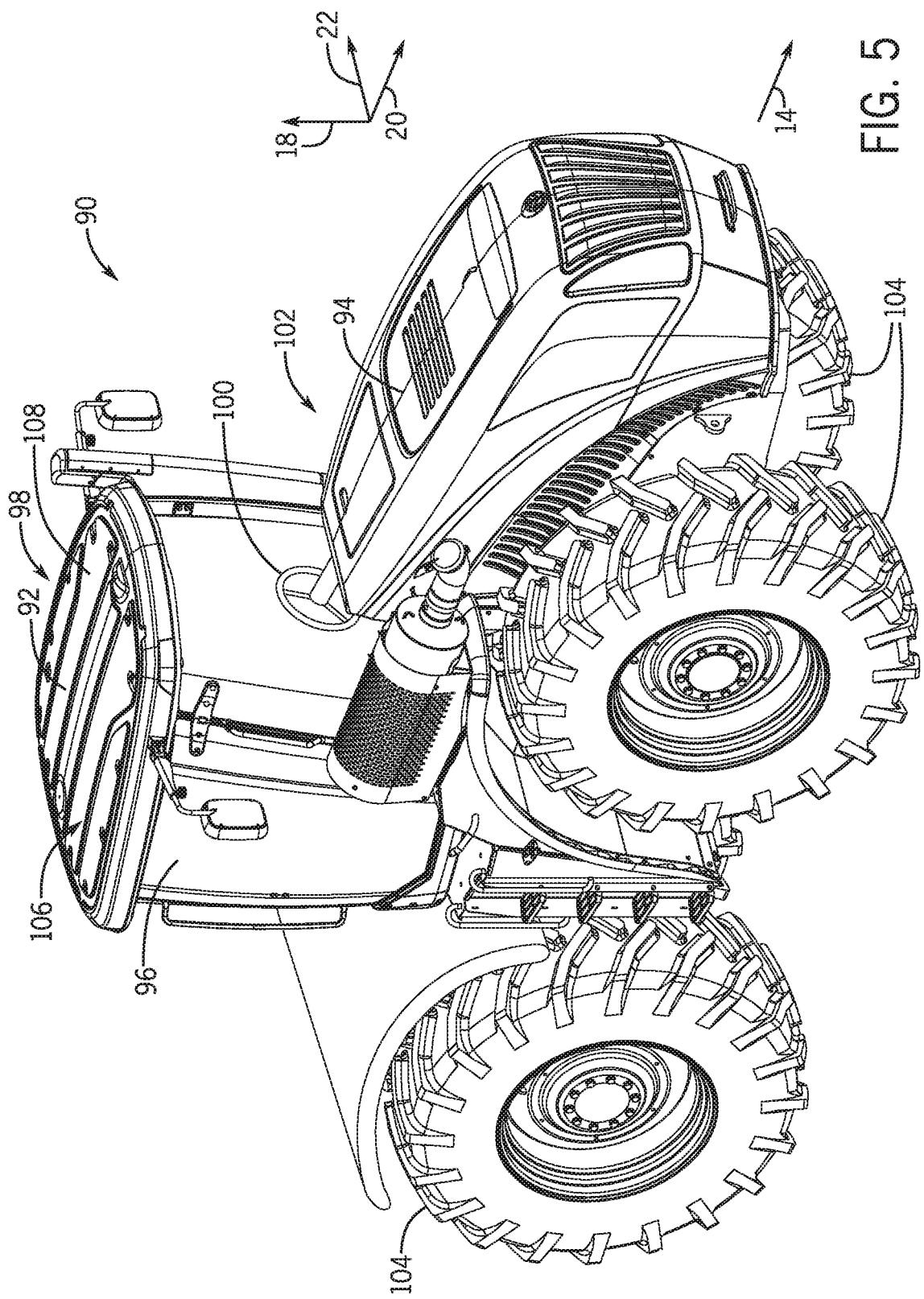
FIG. 5 is a perspective view of an embodiment of a work vehicle that may include one or more antennas positioned under a roof panel and/or under a hood of the work vehicle.

FIG. 5 is a perspective view of an embodiment of a work vehicle 90 that may include one or more antennas positioned under a roof panel 92 and/or under a hood 94 of the work vehicle 90. In the illustrated embodiment, the work vehicle 90 includes a cab 96 configured to house an operator. The cab 96 includes a roof assembly 98 having the roof panel 92. In addition, a steering wheel 100 is disposed within the cab 96 to facilitate control of the work vehicle 90. The cab may also house additional controls to enable the operator to control various functions of the work vehicle (e.g., movement of a tool coupled to the work vehicle, speed of the work vehicle, etc.). In the illustrated embodiment, the work vehicle 90 includes a body 102 having the roof panel 92 and the hood 94. The hood 94 is configured to house an engine, a transmission, other systems of the work vehicle 90, or a combination thereof. In addition, the work vehicle 90 includes wheels 104 configured to be driven by the engine and transmission, thereby driving the work vehicle 90 along a field, a road, or any other suitable surface in the direction of travel 14. While the work vehicle includes wheels in the illustrated embodiment, in alternative embodiments, the work vehicle may include tracks or a combination of wheels and tracks.

In certain embodiments, the work vehicle includes a spatial locating antenna positioned beneath the roof panel 92, such that a top side 106 of the roof panel is positioned above the spatial locating antenna relative to the ground surface (e.g., the top side 106 is positioned above the spatial locating antenna along the vertical axis 18). In addition, the top side 106 extends beyond a longitudinal extent of the spatial locating antenna (e.g., an extent of the spatial locating antenna along the longitudinal axis 20) and a lateral extent of the spatial locating antenna (e.g., an extent of the spatial locating antenna along the lateral axis 22). However, in alternative embodiments, the top side of the roof panel may only extend along a portion of the lateral extent and/or the longitudinal extent of the spatial locating antenna. The roof panel 92 is formed from a material (e.g., fiberglass, a polymeric material, etc.) that facilitates passage of the spatial locating signals (e.g., GPS signals of about 1 GHz to about 2 GHz) through the roof panel 92 to the spatial locating antenna. Positioning the spatial locating antenna beneath the roof panel may enhance the appearance of the work vehicle and/or protect the spatial locating antenna from dirt/debris within the field.

In certain embodiments, a coating 108 is disposed on an outer surface of the top side 106 of the roof panel. The outer surface of the top side 106 faces away from the spatial locating antenna, and the coating 108 is configured to facilitate passage of the spatial locating signal through the roof panel 92 to the spatial locating antenna. For example, the coating may include a non-metallic paint and/or a paint having a low carbon content (e.g., less than 10 percent, less than 5 percent, less than 1 percent, etc.). Alternatively or additionally, the coating 108 may include a decal (e.g., a vinyl decal) disposed on the outer surface of the top side 106 of the roof panel 92. Because the coating facilitates passage of the spatial locating signal to the spatial locating antenna, the coating may cover the entire top surface of the cab (e.g., including the entire outer surface of the top side of the roof panel) without interfering with the spatial locating signal, thereby enhancing the appearance of the work vehicle (e.g., as compared to a first coating disposed over a substantial portion of the top surface and a second coating disposed over the spatial locating antenna, in which the second coating is configured to facilitate passage of the spatial locating signal).

In certain embodiments, the work vehicle 90 may include a headliner disposed between the roof panel 92 and an interior of the cab 96. In such embodiments, the spatial locating antenna may be positioned between the roof panel and the headliner, such that the top side 106 of the roof panel 92 is positioned above the spatial locating antenna relative to the ground surface. Because the spatial locating device is positioned between the roof panel 92 and the headliner, the work vehicle may have a lower profile and/or the appearance of the work vehicle may be enhanced, as compared to a work vehicle having a spatial locating antenna mounted above the roof panel. While the illustrated work vehicle 90 is a tractor, it should be appreciated that the antenna mounting arrangement described herein may be employed within any other suitable type of work vehicle, such as a harvester, a sprayer, or a skid steer, among others.

Figure 6:
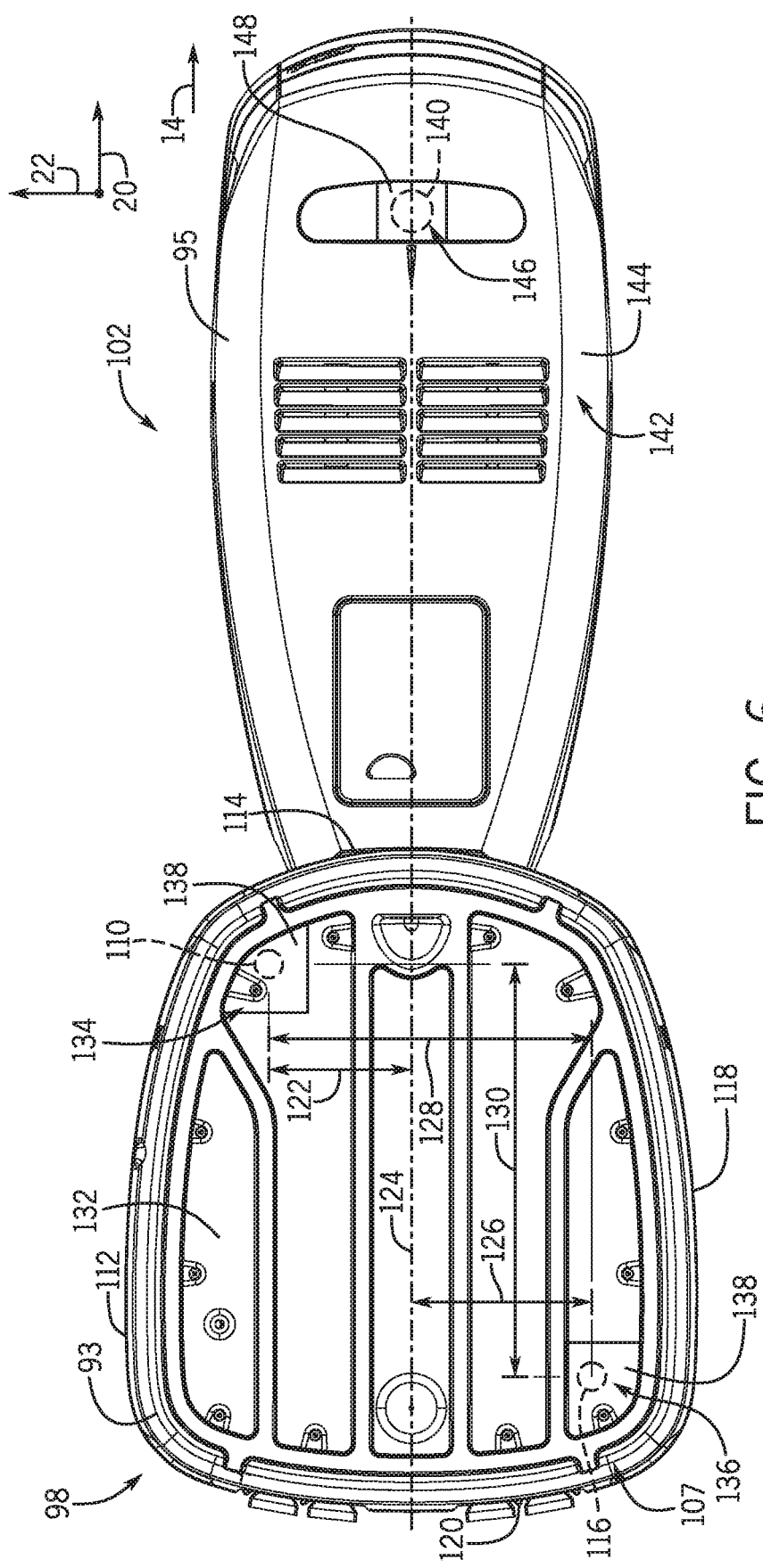
FIG. 6 is a top view of an embodiment of a roof panel and a hood that may be employed within the work vehicle of FIG. 5.

FIG. 6 is a top view of an embodiment of a roof panel 93 and a hood 95 that may be employed within the work vehicle of FIG. 5. As illustrated, a top side 107 of the roof panel 93 forms a top surface of the cab of the work vehicle. In the illustrated embodiment, the work vehicle includes a first spatial locating antenna 110 positioned proximate to a first lateral end 112 of the roof panel 93 (e.g., left end relative to the direction of travel 14) and to a first longitudinal end 114 of the roof panel 93 (e.g., front end relative to the direction of travel 14). In addition, the work vehicle includes a second spatial locating antenna 116 positioned proximate to a second lateral end 118 of the roof panel 93 (e.g., right end relative to the direction of travel 14), opposite the first lateral end 112, and to a second longitudinal end 120 of the roof panel 93 (e.g., back end relative to the direction of travel 14), opposite the first longitudinal end 114. Each spatial locating antenna is positioned beneath the top side 107 of the roof panel 93 relative to the ground surface.

As illustrated, the first spatial locating antenna 110 is positioned a first lateral distance 122 (e.g., distance along the lateral axis 22) from a longitudinal centerline 124, and the second spatial locating antenna 116 is positioned a second lateral distance 126 (e.g., distance along the lateral axis 22) from the longitudinal centerline 124. Accordingly, the first spatial locating antenna 110 is separated from the second spatial locating antenna 116 by a lateral separation distance 128. Because the first spatial locating antenna 110 is positioned proximate to the first lateral end 112 of the roof panel 93, and the second spatial locating antenna 116 is positioned proximate to the second lateral end 118 of the roof panel 93, the lateral separation distance 128 is slightly less than the lateral extent of the roof panel 93 (e.g., extent of the roof panel along the lateral axis 22). In addition, the first spatial locating antenna 110 is positioned a longitudinal distance 130 from the second spatial locating antenna 116. Because the first spatial locating antenna 110 is positioned proximate to the first longitudinal end 114 of the roof panel 93, and the second spatial locating antenna 116 is positioned proximate to the second longitudinal end 120 of the roof panel 93, the longitudinal separation distance 130 is slightly less than the longitudinal extent of the roof panel 93 (e.g., extent of the roof panel along the longitudinal axis 20). As a result, the spatial locating antennas 110 and 116 are positioned a sufficient lateral distance and a sufficient longitudinal distance away from one another to facilitate vehicle orientation determination. Accordingly, the accuracy of the vehicle orientation determination may be enhanced.

Furthermore, because the spatial locating antennas are positioned beneath the roof panel 93, the appearance of the work vehicle may be enhanced, and/or the spatial locating antennas may be protected from dirt/debris within the field. In addition, the roof panel may shield the spatial locating antennas from solar radiation, thereby reducing the temperature of the spatial locating antennas, as compared to spatial locating antennas mounted on an exterior surface of the vehicle body. While the first spatial locating antenna 110 is positioned proximate to the first lateral end 112 and to the first longitudinal end 114 of the roof panel 93, and the second spatial locating antenna 116 is positioned proximate to the second lateral end 118 and to the second longitudinal end 120 of the roof panel 93 in the illustrated embodiment, in alternative embodiments, the first spatial locating antenna and/or the second spatial locating antenna may be positioned at another suitable location beneath the top side of the roof panel. For example, in certain embodiments, at least one of the spatial locating antennas may be positioned along the longitudinal centerline 124, and/or at least one of the spatial locating antennas may be positioned proximate to a longitudinal midpoint of the roof panel.

In the illustrated embodiment, a coating 132 is disposed on an outer surface of the top side 107 of the roof panel 93. The outer surface faces away from the spatial locating antennas. The coating 132 may include paint (e.g., metallic paint, flat paint, pearlescent paint, etc.), a decal (e.g., vinyl decal, etc.), another suitable type of coating (e.g., gel coat, polymeric coating, etc.), or a combination thereof. Certain coatings (e.g., metallic paints, paints having a high carbon content, etc.) may interfere with (e.g., at least partially block) the spatial locating signals. Accordingly, to facilitate passage of the spatial locating signals through the top side 107 of the roof panel 93 to the spatial locating antennas when such a coating is utilized, a first gap 134 in the coating 132 is formed over the first spatial locating antenna 110, and a second gap 136 in the coating 132 is formed over the second spatial locating antenna 116. Each gap is aligned with a respective spatial locating antenna, thereby facilitating passage of the spatial locating signals through the roof panel 93 to the spatial locating antennas. In the illustrated embodiment, the first gap 134 extends beyond the lateral extent and the longitudinal extent of the first spatial locating antenna 110 (e.g., the extent of the first spatial locating antenna 110 along the lateral axis 22 and along the longitudinal axis 20), and the second gap 136 extends beyond the lateral extent and the longitudinal extent of the second spatial locating antenna 116 (e.g., the extent of the second spatial locating antenna 116 along the lateral axis 22 and along the longitudinal axis 20). However, in alternative embodiments, at least one gap may extend over a portion of the lateral extent and/or a portion of the longitudinal extent of the respective spatial locating antenna.

In the illustrated embodiment, a second coating 138 is disposed on the outer surface of the top side 107 of the roof panel 93 within the first gap 134 and within the second gap 136 to enhance the appearance of the work vehicle. The second coating 138 is configured to facilitate passage of the spatial locating signals to the spatial locating antennas. For example, the second coating may include a non-metallic paint and/or a paint having a low carbon content (e.g., less than 10 percent, less than 5 percent, less than 1 percent, etc.). Alternatively or additionally, the second coating may include a decal (e.g., a vinyl decal) disposed on the outer surface of the top side of the roof panel within the gap.

In the illustrated embodiment, the work vehicle includes a third spatial locating antenna 140 positioned beneath the hood 95. As illustrated, a top side 142 of the hood is positioned above the third spatial locating antenna 140 relative to the ground surface. The top side 142 of the hood 95 extends beyond a lateral extent and a longitudinal extent of the third spatial locating antenna 140. However, in alternative embodiments, the top side of the hood may only extend along a portion of the lateral extent and/or the longitudinal extent of the spatial locating antenna. In the illustrated embodiment, the third spatial locating antenna 140 is located at a longitudinally forward portion of the hood 95, thereby positioning the third spatial locating antenna 140 a significant distance from the first and second spatial locating antennas. As a result, the accuracy of the orientation determination (e.g., using the three spatial locating antennas) may be enhanced (e.g., as compared to a configuration that utilizes two spatial locating antennas positioned beneath the roof panel). The hood 95 is formed from a material (e.g., fiberglass, a polymeric material, etc.) that facilitates passage of the spatial locating signals (e.g., GPS signals of about 1 GHz to about 2 GHz) through the hood 95 to the third spatial locating antenna 140. Positioning the third spatial locating antenna beneath the hood 95 may enhance the appearance of the work vehicle and/or protect the spatial locating antenna from dirt/debris within the field.

In the illustrated embodiment, a coating 144 is disposed on an outer surface of the top side 142 of the hood 95. The outer surface of the top side 142 faces away from the third spatial locating antenna 140. The coating 144 may include paint (e.g., metallic paint, flat paint, pearlescent paint, etc.), a decal (e.g., vinyl decal, etc.), another suitable type of coating (e.g., gel coat, polymeric coating, etc.), or a combination thereof. Certain coatings (e.g., metallic paints, paints having a high carbon content, etc.) may interfere with (e.g., at least partially block) the spatial locating signals. Accordingly, to facilitate passage of the spatial locating signals through the top side 142 of the hood 95 to the third spatial locating antenna 140 when such a coating is utilized, a gap 146 in the coating 144 is formed over the third spatial locating antenna 140. As such, the gap 146 is aligned with the third spatial locating antenna 140, thereby facilitating passage of the spatial locating signals through the hood 95 to the third spatial locating antenna 140. In the illustrated embodiment, the gap 146 extends beyond the lateral extent and the longitudinal extent of the third spatial locating antenna 140 (e.g., the extent of the third spatial locating antenna 140 along the lateral axis 22 and along the longitudinal axis 20). However, in alternative embodiments, the gap may extend over a portion of the lateral extent and/or a portion of the longitudinal extent of the third spatial locating antenna.

In the illustrated embodiment, a second coating 148 is disposed on the outer surface of the top side 142 of the hood 95 within the gap 146 to enhance the appearance of the work vehicle. The second coating 148 is configured to facilitate passage of the spatial locating signals to the third spatial locating antenna 140. For example, the second coating may include a non-metallic paint and/or a paint having a low carbon content (e.g., less than 10 percent, less than 5 percent, less than 1 percent, etc.). Alternatively or additionally, the second coating may include a decal (e.g., a vinyl decal) disposed on the outer surface of the top side of the hood within the gap.

In the illustrated embodiment, the work vehicle includes three spatial locating antennas. However, in other embodiments, the work vehicle may include more or fewer spatial locating antennas. For example, in certain embodiments, the third spatial locating antenna positioned beneath the hood may be omitted. In further embodiments, at least one of the spatial locating antennas positioned beneath the roof panel may be omitted. For example, one spatial locating antenna may be positioned at the longitudinally forward portion of the hood, and one spatial locating antenna may be positioned proximate to the second longitudinal end of the roof panel (e.g., at the longitudinal centerline), thereby establishing a sufficient longitudinal distance between the spatial locating antennas to facilitate orientation determination. In further embodiments, any suitable number of spatial locating antennas may be positioned beneath the hood (e.g., 0, 1, 2, 3, 4, 5, 6, or more), and/or any suitable number of spatial locating antennas may be positioned beneath the roof panel (e.g., 0, 1, 2, 3, 4, 5, 6, or more).

In further embodiments, at least one spatial locating antenna may be positioned above the roof panel and/or above the hood. For example, the first spatial locating antenna may be positioned above the roof panel proximate to the first lateral end of the roof panel and to the first longitudinal end of the roof panel, and the second spatial locating antenna may be positioned above the roof panel proximate to the second lateral end of the roof panel and to the second longitudinal end of the roof panel. As a result, the spatial locating antennas may be positioned a sufficient lateral distance and a sufficient longitudinal distance away from one another to facilitate vehicle orientation determination. By way of further example, one spatial locating antenna may be positioned above the hood at the longitudinally forward portion of the hood, and one spatial locating antenna may be positioned above the roof panel proximate to the second longitudinal end of the roof panel (e.g., at the longitudinal centerline), thereby establishing a sufficient longitudinal distance between the spatial locating antennas to facilitate orientation determination.

Figure 7:
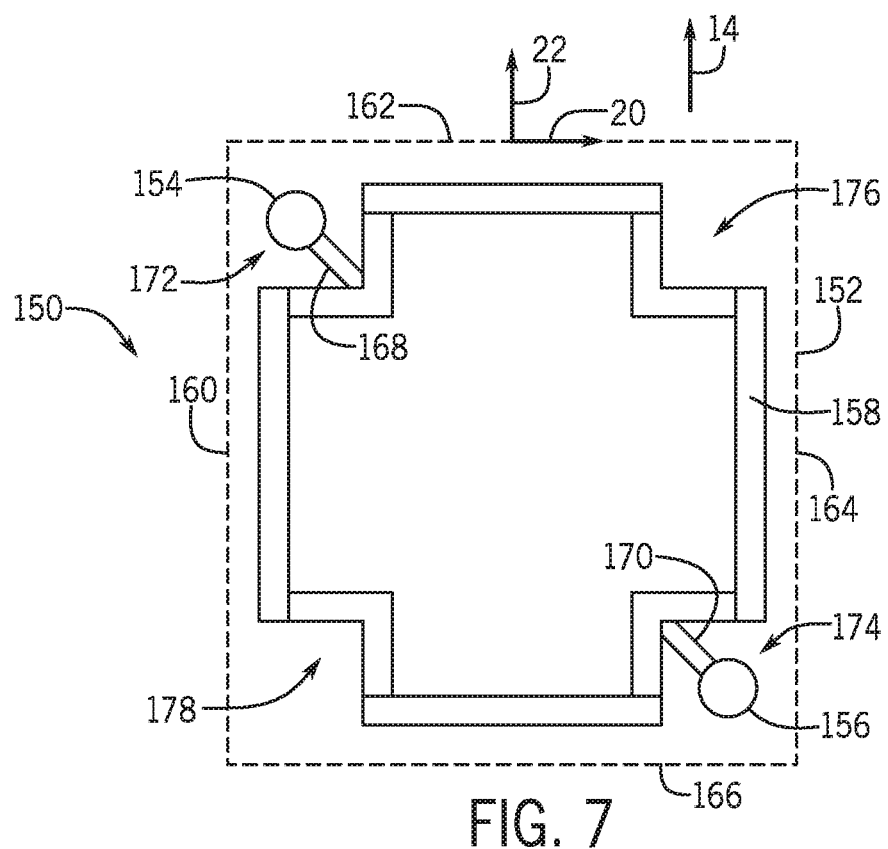
FIG. 7 is a top view of an embodiment of a portion of a roof assembly that may be employed within the work vehicle of FIG. 5.

FIG. 7 is a top view of an embodiment of a portion of a roof assembly 150 that may be employed within the work vehicle of FIG. 5. In the illustrated embodiment, the roof assembly 150 includes a roof panel 152. In addition, a first spatial locating antenna 154 and a second spatial locating antenna 156 are positioned beneath the roof panel 152, such that a top side of the roof panel is positioned above the spatial locating antennas relative to the ground surface. The top side of the roof panel extends beyond a lateral extent of each spatial locating antenna and a longitudinal extent of each spatial locating antenna. However, in alternative embodiments, the top side of the roof panel may only extend along a portion of the lateral extent and/or the longitudinal extent of at least one spatial locating antenna. In certain embodiments, a coating is disposed on an outer surface of the top side of the roof panel 152. The outer surface of the top side faces away from the spatial locating antennas. Furthermore, in certain embodiments, a first gap in the coating is formed over the first spatial locating antenna, and a second gap in the coating is formed over the second spatial locating antenna. Each gap is aligned with the respective spatial locating antenna, thereby facilitating passage of the spatial locating signals through the roof panel to the spatial locating antennas. In certain embodiments, a second coating may be disposed on the outer surface of the top side of the roof panel within the first gap and/or within the second gap to enhance the appearance of the work vehicle.

In the illustrated embodiment, the roof assembly 150 includes a frame 158 configured to support the roof panel 152. The frame 158 may be part of a roll-over protection system (ROPS) and/or a falling object protection system (FOPS). The frame may be formed from any suitable material, such as steel or aluminum. In certain embodiments, the frame is formed from multiple tubes (e.g., square tubes, round tubes, etc.) that are coupled to one another (e.g., by welded connections, by fasteners, etc.).

As illustrated, the first spatial locating antenna 154 is positioned proximate to a first lateral end 160 of the roof panel 152 (e.g., left end relative to the direction of travel 14) and to a first longitudinal end 162 of the roof panel 152 (e.g., front end relative to the direction of travel 14). In addition, the second spatial locating antenna 156 is positioned proximate to a second lateral end 164 of the roof panel 152 (e.g., right end relative to the direction of travel 14), opposite the first lateral end 160, and to a second longitudinal end 166 of the roof panel 152 (e.g., back end relative to the direction of travel 14), opposite the first longitudinal end 162. The first spatial locating antenna 154 is coupled to the frame 158 by a first support 168, and the second spatial locating antenna 156 is coupled to the frame 158 by a second support 170. Each support may be formed from any suitable material, such as metal or plastic, among other suitable materials. In certain embodiments, each support is coupled to a bottom portion of the respective spatial locating antenna, thereby enabling the spatial locating antennas to receive the spatial locating signals without interference, or without significant interface, from the supports.

In the illustrated embodiment, the first spatial locating antenna 154 is positioned within a first recess 172 of the frame 158, and the second spatial locating antenna 156 is positioned within a second recess 174 of the frame 158. In certain embodiments, the elements (e.g., tubes) of the frame 158 that form the recesses are positioned a sufficient distance from the spatial locating antennas to enable the spatial locating antennas to receive the spatial locating signals without interference, or without significant interface, from the frame 158. Furthermore, in certain embodiments, the position of the spatial locating antennas along the vertical axis is substantially equal to the position of the frame 158 along the vertical axis. As a result, the possibility of interface from the frame may be substantially reduced (e.g., as compared to a configuration in which the frame is positioned above the spatial locating antennas along the vertical axis). In addition, because the spatial locating antennas are located at substantially the same vertical position as the frame 158, the thickness of the frame/spatial locating antennas assembly may be reduced (e.g., as compared to configuration in which the frame is positioned above or below the spatial locating antennas along the vertical axis), thereby reducing the height of the work vehicle.

In the illustrated embodiment, the frame 158 also forms a third recess 176 and a fourth recess 178. In certain embodiments, one of the spatial locating antennas may be positioned within the third recess 176, and/or one of the spatial locating antennas may be positioned within the fourth recess 178. Furthermore, while the recesses are positioned at the corners of the frame in the illustrated embodiment, in other embodiments, at least one recess may be positioned at another suitable location. In addition, while the frame forms angled recesses in the illustrated embodiment, in other embodiments, at least one recess may be curved or any other suitable shape.

Figure 8:
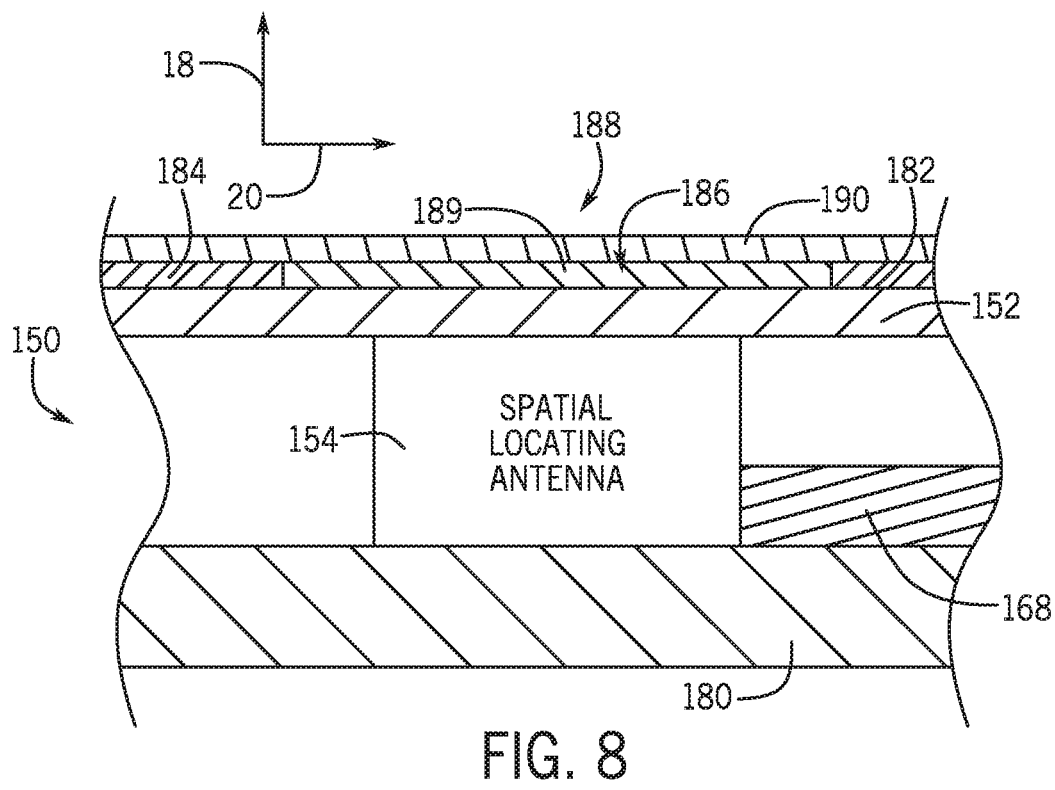
FIG. 8 is a cross-sectional view of the roof assembly of FIG. 7.

FIG. 8 is a cross-sectional view of the roof assembly 150 of FIG. 7. As illustrated, the first spatial locating antenna 154 is coupled to the first support 168, which in turn, is coupled to the frame. The first support 168 is coupled to a bottom portion of the first spatial locating antenna (e.g., lower portion along the vertical axis 18), thereby enabling the spatial locating antenna to receive the spatial locating signal without interference, or without significant interface, from the support. In the illustrated embodiment, the roof assembly 150 includes a headliner 180 disposed between the roof panel 152 and the interior of the cab. In addition, the first spatial locating antenna 154 is positioned between the headliner 180 and the roof panel 152. In the illustrated embodiment, a top side 182 of the roof panel 152 is positioned above the first spatial locating antenna 154 relative to a ground surface along the vertical axis 18. The top side 182 of the roof panel 152 extends beyond a lateral extent and a longitudinal extent of the first spatial locating antenna 154. In addition, the roof panel 152 is formed from a material (e.g., fiberglass, a polymeric material, etc.) that facilitates passage of the spatial locating signals (e.g., GPS signals of about 1 GHz to about 2 GHz) through the roof panel 152 to the spatial locating antenna. Positioning the spatial locating antenna beneath the roof panel 152 may enhance the appearance of the work vehicle and/or protect the spatial locating antenna from dirt/debris within the field. Furthermore, because the spatial locating antenna and the frame are positioned at substantially the same vertical position between the headliner and the roof panel, the thickness of the roof assembly may be reduced (e.g., as compared to a configuration in which the spatial locating antenna(s) are positioned above or below the frame along the vertical axis), thereby reducing the height of the work vehicle.

In the illustrated embodiment, a first coating 184 is disposed on an outer surface of the top side 182 of the roof panel 152. The outer surface of the top side 182 faces away from the first spatial locating antenna 154. The first coating 184 may include paint (e.g., metallic paint, flat paint, pearlescent paint, etc.), a decal (e.g., vinyl decal, etc.), another suitable type of coating (e.g., gel coat, polymeric coating, etc.), or a combination thereof. Certain coatings (e.g., metallic paints, paints having a high carbon content, etc.) may interfere with (e.g., at least partially block) the spatial locating signals. Accordingly, to facilitate passage of the spatial locating signals through the top side 182 of the roof panel 152 to the spatial locating antenna(s) when such a coating is utilized, a gap 186 in the first coating 184 is formed over the first spatial locating antenna 154. The gap 186 is aligned with the first spatial locating antenna 154, thereby facilitating passage of the spatial locating signals through the roof panel 152 to the first spatial locating antenna 154. In the illustrated embodiment, the gap 186 extends beyond the lateral extent and the longitudinal extent of the first spatial locating antenna 154 (e.g., the extent of the first spatial locating antenna 154 along the lateral axis and along the longitudinal axis 20). However, in alternative embodiments, the gap may extend over a portion of the lateral extent and/or a portion of the longitudinal extent of the spatial locating antenna.

In the illustrated embodiment, a second coating 188 is disposed on the outer surface of the top side 182 of the roof panel 152 within the gap 186 to enhance the appearance of the work vehicle. The second coating 188 is configured to facilitate passage of the spatial locating signal to the spatial locating antenna. In the illustrated embodiment, the second coating 188 includes a paint layer 189. The paint layer 189 may include a non-metallic paint and/or a paint having a low carbon content (e.g., less than 10 percent, less than 5 percent, less than 1 percent, etc.). In alternative embodiments, the second coating may include a decal (e.g., a vinyl decal) disposed on the outer surface of the top side of the roof panel within the gap. In the illustrated embodiment, the second coating 188 includes a top coat layer 190 disposed on an outer surface of the paint layer 189. The top coat layer 190 may enhance the appearance of the second coating, thereby enhancing the appearance of the work vehicle. The top coat layer 190 is formed from a material (e.g., a polymeric material) configured to facilitate passage of the spatial locating signals through the second coating. In the illustrated embodiment, the first coating also includes the top coat layer. However, in alternative embodiments, the first coating and/or the second coating may omit the top coat layer.

While the coatings (e.g., including the gap in the first coating) are disclosed above with reference to the first spatial locating antenna, in certain embodiments, the coatings may be disposed on the outer surface of the roof panel at/around the second spatial locating antenna. In addition, while the illustrated first and second coatings are disclosed above with reference to a roof panel, in certain embodiments, the first and second coatings (e.g., including the gap in the first coating) may be applied to other outer surface(s) of the work vehicle body, such as the outer surface of the hood. Furthermore, while the illustrated embodiment includes a first coating and a second coating, in other embodiments, a single coating (e.g., including a top coat layer) may be disposed on the outer surface of the top side of the roof panel or another suitable outer surface of the work vehicle body. In such embodiments, the coating is configured to facilitate passage of the spatial locating signal(s) through the roof panel/body to the spatial locating antenna(s). For example, the coating may include a non-metallic paint and/or a paint having a low carbon content (e.g., less than 10 percent, less than 5 percent, less than 1 percent, etc.). Alternatively or additionally, the coating may include a decal (e.g., a vinyl decal) disposed on the outer surface.

In certain embodiments, one or more features of the embodiments disclosed above with reference to FIGS. 1-4 may be used in any suitable combination with one or more other features of the embodiments disclosed above with reference to FIGS. 5-8. In addition, features of any of the embodiments disclosed above with reference to FIG. 5-8 may be used in any suitable combination with one another. For example, in certain embodiments, the frame disclosed above with reference to FIG. 7 may be used within the work vehicle disclosed above with reference to FIG. 5. Furthermore, in certain embodiments, the single coating configured to facilitate passage of the spatial locating signals through the roof panel to the spatial locating antennas disclosed above with reference to FIG. 5 may be used in combination with the two spatial locating antennas positioned beneath the roof panel disclosed above with reference to FIG. 6. In addition, the spatial locating antennas disclosed above with reference to FIGS. 3-8 may be communicatively coupled to the spatial locating device disclosed above with reference to FIG. 2.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A work vehicle, comprising:
a roof panel forming a portion of a cab of the work vehicle;
a headliner disposed between the roof panel and an interior of the cab;
a first spatial locating antenna positioned between the roof panel and the headliner, such that a top side of the roof panel is positioned above the first spatial locating antenna relative to a ground surface, wherein the top side of the roof panel extends beyond a lateral extent and a longitudinal extent of the first spatial locating antenna;
a hood; and
a second spatial locating antenna positioned beneath the hood, wherein a top side of the hood is positioned above the second spatial locating antenna relative to the ground surface, and the top side of the hood extends beyond a lateral extent and a longitudinal extent of the second spatial locating antenna.

2. The work vehicle of claim 1, wherein the first spatial locating antenna is communicatively coupled to a spatial locating device.

3. The work vehicle of claim 2, wherein the first spatial locating antenna comprises a global positioning system (GPS) antenna, and the spatial locating device comprises a GPS receiver.

4. The work vehicle of claim 1, comprising a second spatial locating antenna positioned between the roof panel and the headliner.

5. The work vehicle of claim 4, wherein the first spatial locating antenna is positioned proximate to a first lateral end of the roof panel and to a first longitudinal end of the roof panel, and the second spatial locating antenna is positioned proximate to a second lateral end of the roof panel, opposite the first lateral end, and to a second longitudinal end of the roof panel, opposite the first longitudinal end.

6. The work vehicle of claim 1, comprising a coating disposed on an outer surface of the top side of the roof panel, wherein the outer surface of the top side faces away from the first spatial locating antenna.

7. The work vehicle of claim 6, wherein the coating includes a gap aligned with the first spatial locating antenna to facilitate passage of a spatial locating signal through the roof panel to the first spatial locating antenna.

8. The work vehicle of claim 7, wherein the gap extends beyond the lateral extent of the first spatial locating antenna, the longitudinal extent of the first spatial locating antenna, or a combination thereof.

9. The work vehicle of claim 7, comprising a second coating disposed on the outer surface of the top side of the roof panel within the gap, wherein the second coating is configured to facilitate passage of the spatial locating signal to the first spatial locating antenna.

10. A work vehicle, comprising:
a body;
a spatial locating antenna positioned beneath the body, wherein a top side of the body is positioned above the spatial locating antenna relative to a ground surface, and the top side extends beyond a lateral extent and a longitudinal extent of the spatial locating antenna;
a first coating disposed on an outer surface of the top side of the body, wherein the outer surface of the top side faces away from the spatial locating antenna, and the first coating includes a gap aligned with the spatial locating antenna to facilitate passage of a spatial locating signal through the body to the spatial locating antenna; and
a second coating disposed on the outer surface of the top side of the body within the gap, wherein the second coating comprises a paint layer, and the second coating is configured to facilitate passage of the spatial locating signal to the spatial locating antenna.

11. The work vehicle of claim 10, wherein the gap extends beyond the lateral extent of the spatial locating antenna, the longitudinal extent of the spatial locating antenna, or a combination thereof.

12. The work vehicle of claim 10, wherein the second coating comprises a top coat layer disposed on an outer surface of the paint layer.

13. The work vehicle of claim 10, wherein the body comprises a roof panel forming a portion of a cab of the work vehicle, and the spatial locating antenna is positioned beneath the roof panel.

14. The work vehicle of claim 13, comprising a second spatial locating antenna, wherein the body comprises a hood, and the second spatial locating antenna is positioned beneath the hood.

15. A work vehicle, comprising:
a roof panel forming a portion of a cab of the work vehicle;
a first spatial locating antenna positioned beneath the roof panel, such that a top side of the roof panel is positioned above the first spatial locating antenna relative to a ground surface, wherein the top side of the roof panel extends beyond a lateral extent and a longitudinal extent of the first spatial locating antenna;
a coating disposed on an outer surface of the top side of the roof panel, wherein the outer surface of the top side of the roof panel faces away from the first spatial locating antenna, and the coating is configured to facilitate passage of a spatial locating signal through the roof panel to the first spatial locating antenna,
a hood; and
a second spatial locating antenna positioned beneath the hood, wherein a top side of the hood is positioned above the second spatial locating antenna relative to the ground surface, and the top side of the hood extends beyond a lateral extent and a longitudinal extent of the second spatial locating antenna.

16. The work vehicle of claim 15, comprising a headliner disposed between the roof panel and an interior of the cab, wherein the first spatial locating antenna is positioned between the roof panel and the headliner.

17. The work vehicle of claim 15, comprising a second spatial locating antenna positioned beneath the roof panel.

18. The work vehicle of claim 17, wherein the first spatial locating antenna is positioned proximate to a first lateral end of the roof panel and to a first longitudinal end of the roof panel, and the second spatial locating antenna is positioned proximate to a second lateral end of the roof panel, opposite the first lateral end, and to a second longitudinal end of the roof panel, opposite the first longitudinal end.

* * * * *